(12) United States Patent
Lingadahalli et al.

(10) Patent No.: US 10,153,982 B2
(45) Date of Patent: Dec. 11, 2018

(54) METHOD AND APPARATUS FOR GENERATING FRAMES BASED ON FRAME PACKING RULES

(71) Applicant: GM GLOBAL TECHNOLOGY OPERATIONS LLC, Detroit, MI (US)

(72) Inventors: Sandhya Lingadahalli, Bangalore (IN); Srinath Srinivasamurthy, Bangalore (IN); Sudhakaran Maydiga, Troy, MI (US); Anand Harogoppad, Bangalore (IN)

(*) Notice: Subject to any disclaimer, the term of this patent is extended or adjusted under 35 U.S.C. 154(b) by 136 days.

(21) Appl. No.: 15/242,945

(22) Filed: Aug. 22, 2016

(65) Prior Publication Data

US 2018/0054393 A1    Feb. 22, 2018

(51) Int. Cl.
*H04L 12/40* (2006.01)
*H04L 12/805* (2013.01)
*H04L 12/24* (2006.01)
*H04L 12/841* (2013.01)
*H04L 29/06* (2006.01)
*H04L 29/08* (2006.01)

(52) U.S. Cl.
CPC ............ *H04L 47/365* (2013.01); *H04L 12/40* (2013.01); *H04L 41/12* (2013.01); *H04L 47/28* (2013.01); *H04L 67/12* (2013.01); *H04L 69/22* (2013.01); *H04L 2012/40215* (2013.01)

(58) Field of Classification Search
CPC .......... H04L 12/40; H04L 47/10–47/41; H04L 47/50–47/6295; H04L 2012/40273
See application file for complete search history.

(56) References Cited

U.S. PATENT DOCUMENTS

| | | | |
|---|---|---|---|
| 2003/0176951 A1* | 9/2003 | DeMarchi et al. | G05D 17/00 700/286 |
| 2007/0201397 A1* | 8/2007 | Zhang | H04Q 7/00 370/329 |
| 2015/0063371 A1* | 3/2015 | Horvath et al. | H04L 47/826 370/461 |

OTHER PUBLICATIONS

Kang et al., Frame Packing for Minimizing the Bandwidth Consumption of the FlexRay Static Segment, IEEE Transactions on Industrial Electronics, vol. 60, No. 9, Sep. 2013, p. 4001-4008. (Year: 2013).*

* cited by examiner

*Primary Examiner* — Hoon J Chung

(57) ABSTRACT

A method and apparatus for generating frames for communicating over a network are provided. The method includes: receiving input signals and signal information comprising at least one from among new signal information, existing data dictionary information, and topology information, determining frame packing rules based on the received signal information, and generating frames of output data based on the determined frame packing rules. The method may be used to package vehicle controller area network messages for transmission over other networks.

16 Claims, 5 Drawing Sheets

METHOD AND APPARATUS FOR GENERATING FRAMES BASED ON FRAME PACKING RULES

INTRODUCTION

Apparatuses and methods consistent with exemplary embodiments relate to communication architectures. More particularly, apparatuses and methods consistent with exemplary embodiments relate to serial data communication architectures.

SUMMARY

One or more exemplary embodiments provide a method and an apparatus that package data into frames. More particularly, one or more exemplary embodiments provide a method and an apparatus that package input data into frames based on optimization variables.

According to an aspect of an exemplary embodiment, a method for generating frames in a vehicle communication network is provided. The method includes receiving input signals and signal information comprising at least one from among new signal information, existing data dictionary information, and topology information, determining frame packing rules based on the received signal information, and generating frames of output data based on the determined frame packing rules.

The method may also include estimating bus load and message latency of the generated frames, determining whether the estimated bus load and message latency fall within predetermined bus load and message latency parameters, in response to determining that the estimated bus load and message latency fall are outside of the predetermined bus load and message latency parameters, determining new frame packing rules based on the signal information and the estimated bus load and message latency, and generating frames of output data based on the determined new frame packing rules.

The determining the packing rules based on the signal information may include: mapping the input signals to frames based on a best fit algorithm, reducing a number of the frames, and assigning priorities to each of the frames based on a periodic rate and minimum update time of the input signals.

The determining the packing rules based on the signal information may also include: for each of the frames, determining whether a frame uses protocol data unit (PDU) routing or signal routing based on a number of bits in a frame, and eliminating burst and priority inversion by assigning offsets to the frames.

The determining whether the frame uses PDU routing or signal routing based on the number of bits in the frame may include: assigning a frame to PDU routing if the input signals are group signals and assigning a frame to PDU routing if the frame is larger than a predetermined size.

The existing data dictionary information may include information on a signal and a network the signal is being communicated on.

The topology information may include at least one from among information on electronic controller unit (ECU) to bus mapping, information on a protocol used by an ECU, and information on buses used by an ECU.

The input signals may be received via a controller area network (CAN) bus.

The input signals may be received via a gateway.

According to an aspect of another exemplary embodiment, a non-transitory computer readable medium comprising computer executable instructions executable by a processor to perform the method for generating frames in a vehicle communication network is provided.

According to an aspect of another exemplary embodiment, an apparatus for generating frames for a communication network is provided, the apparatus includes: at least one memory comprising computer executable instructions; and at least one processor configured to read and execute the computer executable instructions, the computer executable instructions causing the at least one processor to: receive input signals and signal information comprising at least one from among new signal information, existing data dictionary information, and topology information; determine frame packing rules based on the received signal information; and generate frames of output data based on the determined frame packing rules.

The computer executable instructions may further cause the at least one processor to: estimate bus load and message latency of the generated frames, determine whether the estimated bus load and message latency fall within predetermined bus load and message latency parameters, in response to determining that the estimated bus load and message latency fall are outside of the predetermined bus load and message latency parameters, determine new frame packing rules based on the signal information and the estimated bus load and message latency, and generate frames of output data based on the determined new frame packing rules.

The computer executable instructions may cause the at least one processor to determine the packing rules based on the signal information by: mapping the input signals to frames based on a best fit algorithm, reducing a number of the frames, and assigning priorities to each of the frames based on a periodic rate and minimum update time of the input signals.

The computer executable instructions may further cause the at least one processor to determine the packing rules based on the signal information by: for each of the frames, determining whether a frame uses protocol data unit (PDU) routing or signal routing based on a number of bits in a frame, and eliminating burst and priority inversion by assigning offsets to the frames.

The computer executable instructions may cause the at least one processor to determine whether each of the frames use PDU routing or signal routing based on the number of bits in the frame by: assigning a frame to PDU routing if the input signals are group signals; and assigning a frame to PDU routing if the frame is larger than a predetermined size.

The existing data dictionary information may include information on a signal and a network the signal is being communicated on.

The topology information may include at least one from among information on electronic controller unit (ECU) to bus mapping, information on a protocol used by an ECU, and information on buses used by an ECU.

The computer executable instructions may cause the at least one processor to receive the input signals via a controller area network (CAN) bus.

The computer executable instructions may cause the at least one processor to receive the input signals via a gateway.

According to an aspect of another exemplary embodiment, a non-transitory computer readable medium comprising instructions executable by a processor to perform a method for communicating over a vehicle network is provided. The method includes: receiving, from a controller area network (CAN) of a vehicle, input signals and signal information comprising at least one from among new signal information, existing data dictionary information, and topology information; determining frame packing rules based on the received signal information; and generating frames of output data based on the determined frame packing rules.

Other objects, advantages and novel features of the exemplary embodiments will become more apparent from the following detailed description of exemplary embodiments and the accompanying drawings.

DETAILED DESCRIPTION

Figure 1:
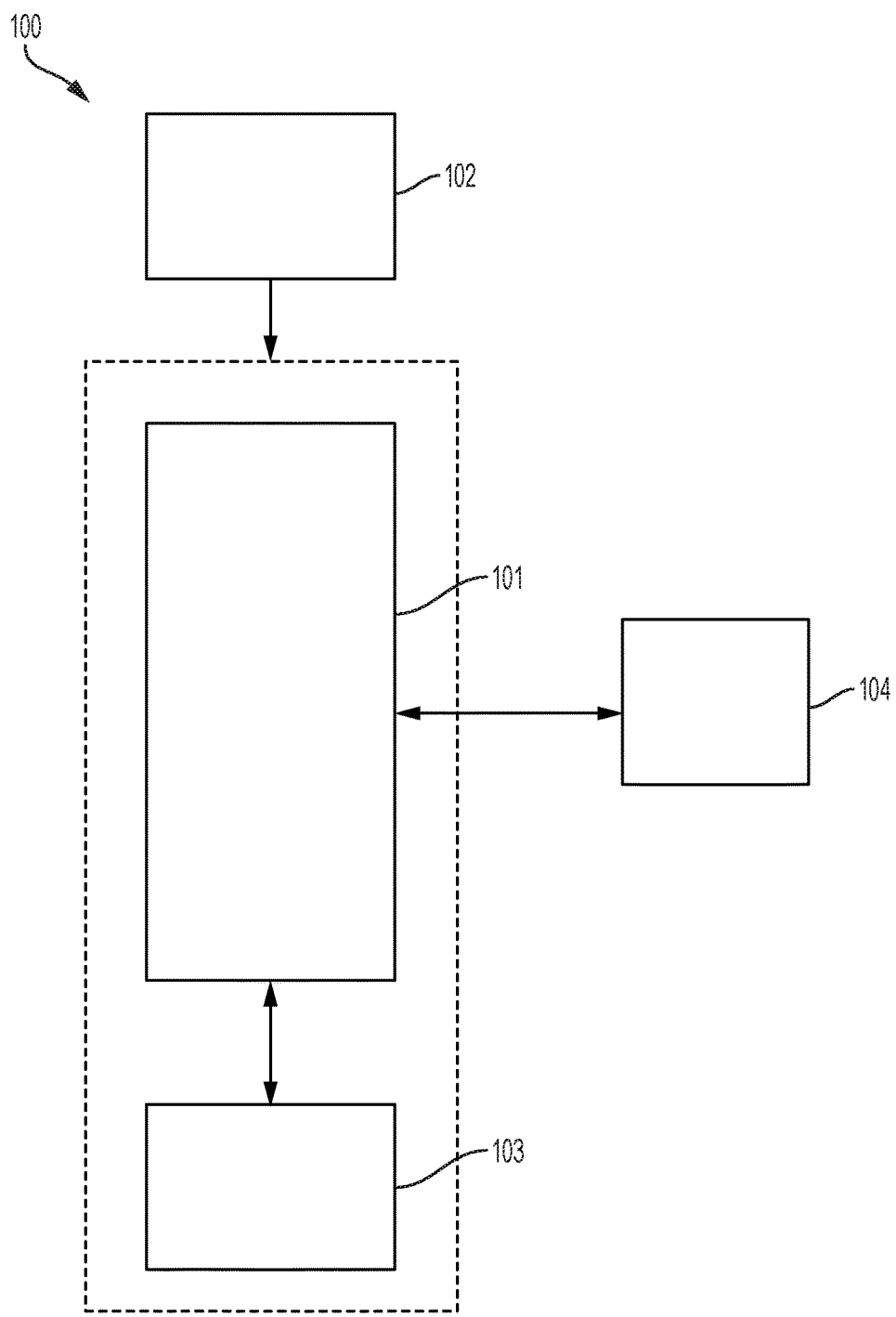
FIG. 1 shows a block diagram of an apparatus for generating frames according to an exemplary embodiment.

An apparatus and method that generate frames in a vehicle communication network will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

Serial data communication architecture may be used to send and receive data across networks, communication channels, buses, etc. Serial communication architectures may include, but are not limited to, Ethernet, Universal Serial Bus, FireWire, Controller Area Network, etc.

FIG. 1 shows a block diagram of an apparatus for generating frames (i.e., a network communication apparatus, apparatus for communicating on a network, an apparatus for generating frames in a vehicle communication network, etc.) according to an exemplary embodiment. As shown in FIG. 1, the apparatus for generating frames 100, according to an exemplary embodiment, includes a controller 101, a power supply 102 and a storage 103. The apparatus for generating frames 100 may be configured to send and receive information over communication networks 104. However, the apparatus for generating frames 100 is not limited to the aforementioned configuration and may be configured to include additional elements and/or or omit one or more of the aforementioned elements.

The controller 101 controls the overall operation and function of the apparatus for generating frames 100. The controller 101 may control one or more of the power supply 102, the storage 103, and may control to send and receive data to and from communication networks 104. The controller 101 may include one or more from among a processor, a microprocessor, a central processing unit (CPU), electronic controller unit (ECU), a graphics processor, Application Specific Integrated Circuits (ASICs), Field-Programmable Gate Arrays (FPGAs), circuitry, state machines, and a combination of hardware, software and firmware components.

The power supply 102 provides power to one or more components of the apparatus for generating frames 100, such as the controller 101 and the storage 103, and may also power the communication networks 104. The power supply 102 may include one or more from among a battery, an outlet, a capacitor, a solar energy cell, a generator, a wind energy device, an alternator, or other electrical connection, etc.

The storage 103 is configured for storing information and retrieving information used by the apparatus for generating frames 100. The storage 103 may be controlled by the controller 101 to store and retrieve condition information such as data sent and received from the communication networks 104 and computer executable instructions that are executable by the controller to perform the functions of the apparatus for generating frames 100. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The communication networks 104 may be used by the apparatus for generating frames 100 to communicate with various types of external apparatuses according to various communication methods. The communication networks 104 may be used to receive data, such as data from a controller area network (CAN) bus and data received via a gateway entity or device, and transmit packaged data to devices such as mobile phones, servers, computers, smart watches, laptops, tablets, etc.

The apparatus for generating frames 100 may include one or more communication devices or communication modules (not shown) that may be used to send and receive data across the communication networks 104. The various communication devices and modules may include one or more from among a broadcast receiving module, a near field communication (NFC) module, a GPS module, and a wireless communication module. The broadcast receiving module may include a terrestrial broadcast receiving module including an antenna to receive a terrestrial broadcast signal, a demodulator, and an equalizer. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or an IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, or ZigBee.

The communication networks 104 may be used to send data that causes notifications including one or more from among an audible notification, a light notification, and a display notification reflecting the data being communicated from the controller 101 and to be output at another device. The communication networks 104 may further be used to send data that is to be stored in a database on a server or a computer and retrieved for processing as necessary.

According to an exemplary embodiment, the controller 101 of the apparatus for generating frames 100 is configured to receive input signals and signal information comprising at least one from among new signal information, existing data dictionary information, and topology information, determine frame packing rules based on the received signal information, and generate frames of output data based on the determined frame packing rules. The generated frames of output data may include the received input signals.

Figure 2:
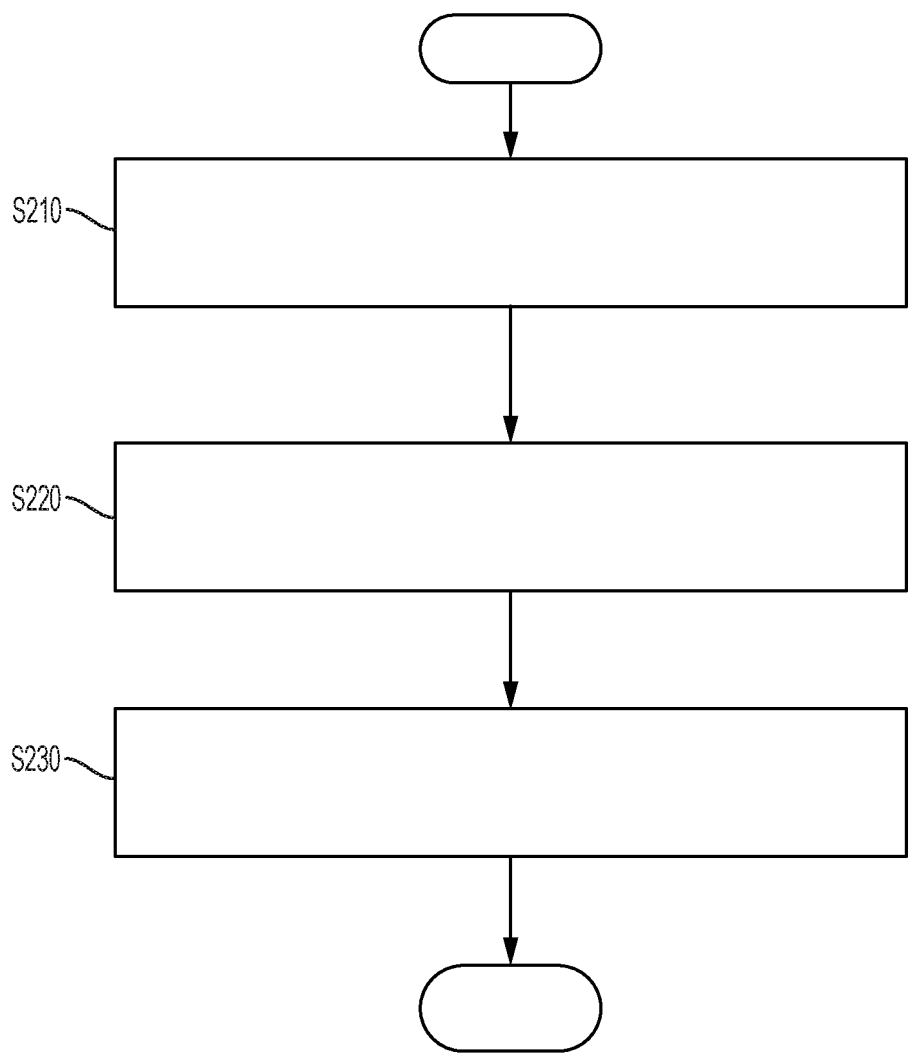
FIG. 2 shows a flowchart for a method of generating frames in a communication network according to an exemplary embodiment.

FIG. 2 shows a flowchart for a method of generating frames in a communication network according to an exemplary embodiment. The method of FIG. 2 may be performed by the apparatus for generating frames 100 or may be encoded into a computer readable medium as instructions that are executable by a computer to perform the method.

Referring to FIG. 2, input signals and signal information are received in operation S210. The input signals and signal information may be received from a communication network from among communication networks 104. In one exemplary embodiment, the input signals and signal information may be received via a gateway device or entity. The signal information may include at least one from among new signal information, existing data dictionary information, and topology information.

The new signal information may include one or more from among information on a signal name, information on a signal length, information on timing (e.g., periodicity, minimum update time), information on whether the signals are routed (e.g., signals are received from a network other than the network from which they have been transmitted), information on a transmitting electronic controller unit, information on a receiving electronic controller unit, information on signal grouping, information on a network from which a frame is received, and information on a network to which a frame is being sent.

The existing data dictionary information may include one or more from among information on a frame name, information on a frame period, information on signals belonging to a frame, information on a frame size, information on a minimum update time, information on a transmitting electronic controller unit, information on a receiving electronic controller unit, information on a network from which a frame is received, information on a network to which a frame is being sent, information on a speed of a network, and information on a type of network. The topology information may include network topology information such as information on nodes, servers, gateways, network structure, etc. For example, topology information may include electronic controller unit (ECU) to bus mapping, information on a protocol used by an ECU, and information on buses used by an ECU.

Based on the input signals and signal information received in operation S210, frame packing rules are determined in operation S220. Frames of output data are generated in operation S230 based on the frame packing rules determined in operation S220. The generated frames may be output to be transmitted over a communication network from among communication networks 104.

Figure 3:
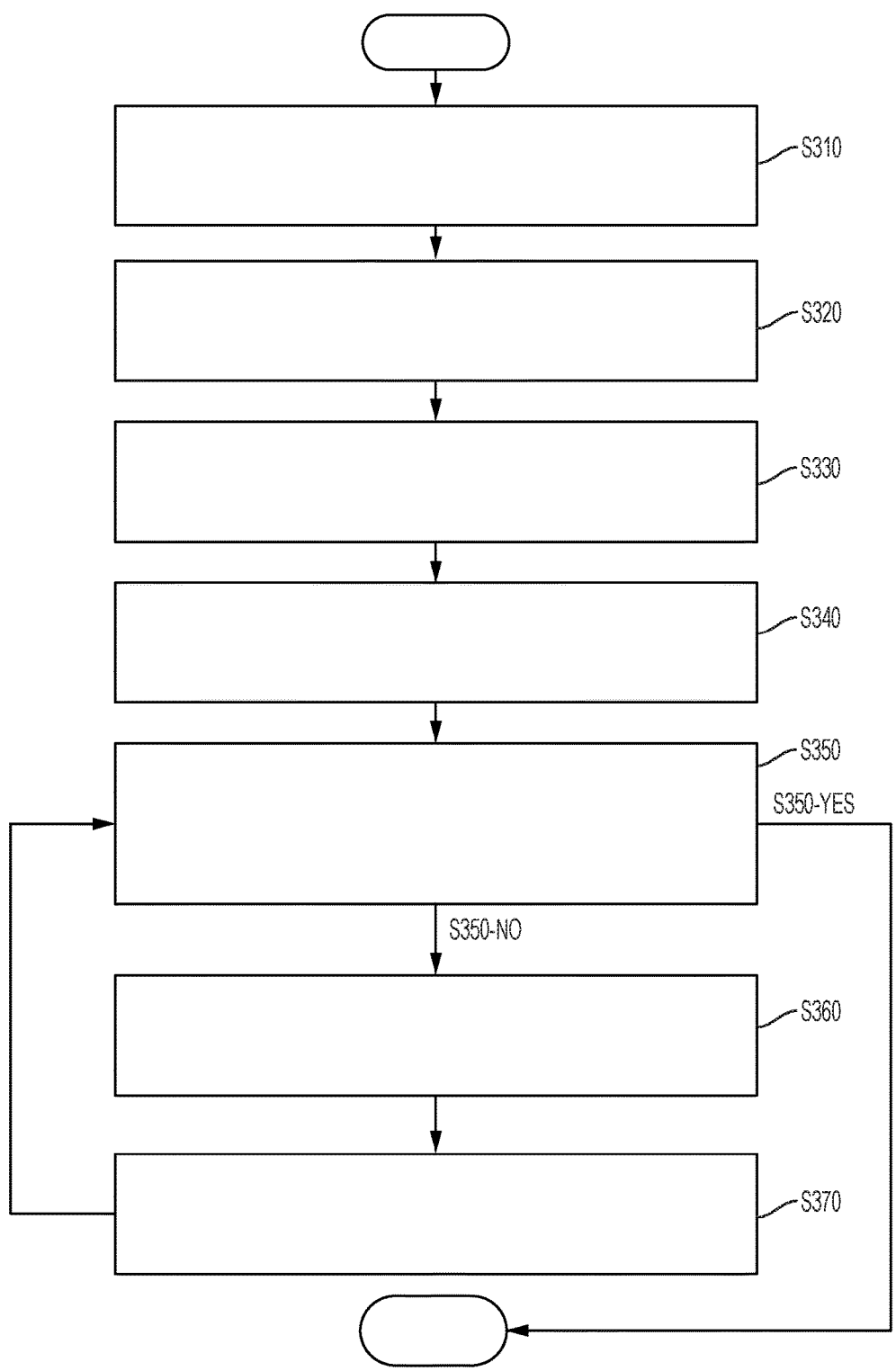
FIG. 3 shows a flowchart for a method of generating frames in a communication network according to an aspect of an exemplary embodiment.

FIG. 3 shows a flowchart for a method of generating frames in a communication network according to an aspect of an exemplary embodiment. The method of FIG. 3 may be performed by the apparatus for generating frames 100 or may be encoded into a computer readable medium as instructions that are executable by a computer to perform the method.

Referring to FIG. 3, operations S310-S330 are similar to operations S210-S230 and thus the descriptions of operations S310-S330 are similar to the descriptions of operations S210-S230 described above. After operation S330, the bus load and message latency of the frames generated in operation S330 are estimated in operation S340. In operation S350, it is determined whether the estimated bus load and message latency fall within predetermined bus load and message latency parameters. If the estimated bus load and message latency fall within predetermined bus load and message latency parameters (operation S350—YES), the process ends. If the estimated bus load and message latency are outside predetermined bus load and message latency parameters (operation S350—NO), new frame packing rules based on signal information, the estimated bus load and message latency are determined in operation S360. In operation S370, frames of output data are generated based on the determined new frame rules and the method returns to operation S350.

Figure 4:
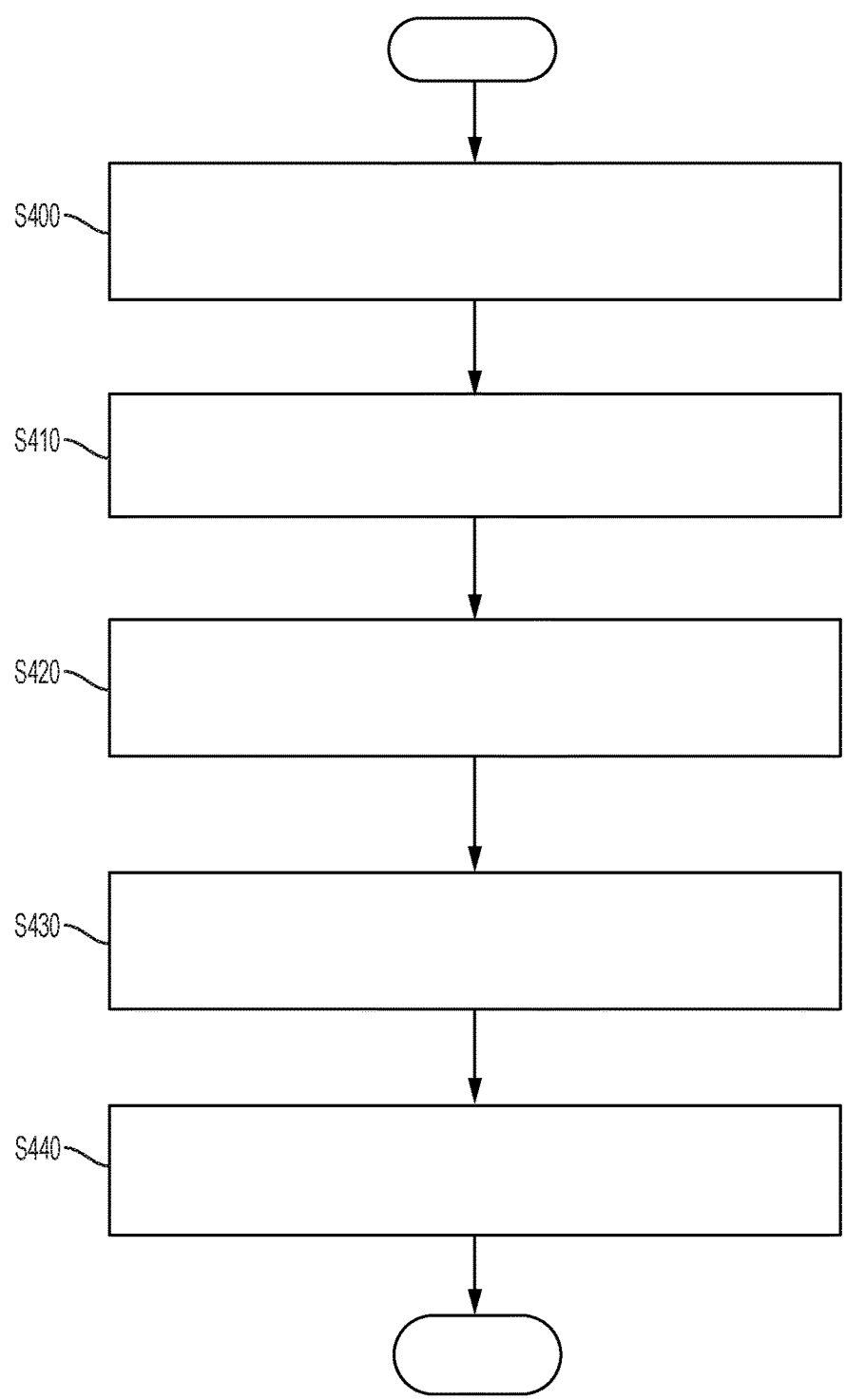
FIG. 4 shows a flowchart for a method of determining the packing rules according to an aspect of an exemplary embodiment.

FIG. 4 shows a flowchart for a method of determining the packing rules according to an aspect of an exemplary embodiment. The method of FIG. 4 may be performed by the apparatus for generating frames 100 or may be encoded into a computer readable medium as instructions that are executable by a computer to perform the method.

Referring to FIG. 4, input signals are mapped to frames based on a best fit algorithm in operation S400. In other words, input signals are mapped to frames such that as much of the available space in the frame is used as possible. The best fit algorithm may be a best fit decreasing algorithm where the frames are sorted in ascending order of size. The signals to be added are arranged in decreasing order of size. Each signal is picked up and the frames of the signal are scanned to check which signal fits in the frame with the least amount of space left. An example of best fit algorithm is described below with respect to FIG. 5.

The number of frames are reduced in operation S410 by moving data in one frame to another frame that has available space for the data. The frames may be reduced by performing a fuzzy logic algorithm. For example, the algorithm may classify bus load percentage change into five categories, large decrease, decrease, no change, increase, and large increase, according to predetermined bus load change thresholds for each category. The algorithm may also classify latency change into five categories, large decrease, decrease, no change, increase, and large increase, according to predetermined latency timing (ms) thresholds for each category.

According to one example, if a length of a first PDU and a length of second PDU are less than a maximum PDU length for a protocol, a period of a frame of the first PDU is less than a period of a frame of the second PDU, a change in bandwidth consumption caused by a new frame is less than a predetermined tolerance, and a latency of the new frame is less than or equal to a lesser of the latencies of the first PDU and the second PDU, the first PDU and the second PDU may be merged. Otherwise, the first PDU and the second PDU may not be merged.

In operation S420, priorities are then assigned to the frames based on a periodic rate and minimum update time of the input signal. In operation S430, for each of the frames, it is determined whether a frame uses PDU routing or signal routing based on the number of bits in the frame. The determining whether each of the frames use PDU routing or signal routing based on the number of bits in the frame may include assigning a frame to PDU routing if the input signals are group signals; and assigning a frame to PDU routing if the frame is larger than a predetermined size. In addition, PDU routing may also be performed if the load at gateway controller is greater than a predetermined load because signal routing needs the frame to be unpacked and repacked again, which would increase gateway load. Further, if a critical frame with high periodicity (e.g., 10 ms) has to be transmitted without any gateway delays, then it may be PDU routed.

In operation S440, burst and priority inversion is eliminated by assigning offsets to the frames. Offsets may be assigned after latency calculations. For example, latency calculation and pre-analysis helps to decide what offsets can be set to the frames so that frames are not transmitted together at a single point in time, which may lead to dropped or missing frames.

Figure 5:
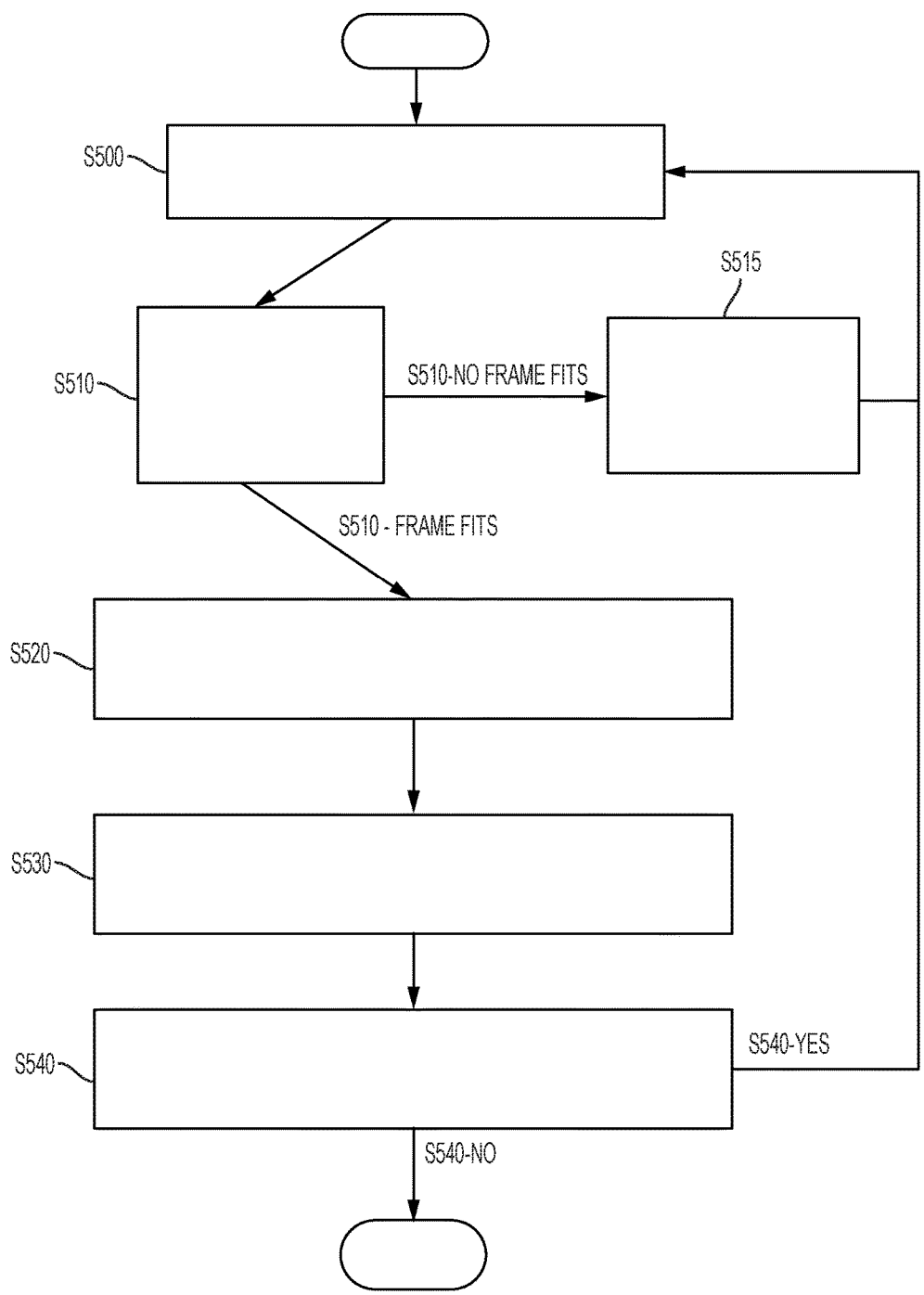
FIG. 5 shows a flowchart for a method of assigning signals to frames according to an aspect of an exemplary embodiment.

FIG. 5 shows a flowchart for a method of assigning signals to frames according to an aspect of an exemplary embodiment. The method of FIG. 5 may be performed by the apparatus for generating frames 100 or may encoded into a computer readable medium as instructions that are executable by a computer to perform the method.

Referring to FIG. 5, signals are sorted in descending order of size and frames are sorted in ascending order of size in operation S500. In operation S510, the frames in which the first signal from among the sorted signals fits are determined. However, if no frame fits (operation S510—NO FRAME FITS), a new frame is created and the first signal is added to the new frame in operation S515. If one or more frames fit the new signal (operation S510—FRAME FITS), the frame(s) that would have a least amount of space from among the frames in which the new signal fits are determined in operation S20. A frame from among the determined frame(s) with the least amount of space is selected and the new signal is added to the selected frame in operation S530. Then, it is determined whether there are any new signals left to add in operation S540. If there are new signals left to add (operation S540—YES), the process returns to operation S500. If there are no more new signals left to add (operation S540—NO), the process ends.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for generating frames in a vehicle communication network, the method comprising:
  receiving input signals and signal information, the signal information comprising at least one from among new signal information, existing data dictionary information, and topology information;
  determining frame packing rules based on the received signal information; and
  generating frames of output data based on the determined frame packing rules,
  wherein the determining the packing rules based on the signal information further comprises:
    mapping the input signals to frames based on a best fit algorithm;
    reducing a number of the frames;
    assigning priorities to each of the frames based on a periodic rate and minimum update time of the input signals;
    for each of the frames, determining whether a frame uses protocol data unit (PDU) routing or signal routing based on a number of bits in a frame, and
    eliminating burst and priority inversion by assigning offsets to the frames.

2. The method of claim 1, further comprising:
  estimating bus load and message latency of the generated frames;
  determining whether the estimated bus load and message latency fall within
  predetermined bus load and message latency parameters;
  in response to determining that the estimated bus load and message latency fall are outside of the predetermined bus load and message latency parameters, determining new frame packing rules based on the signal information and the estimated bus load and message latency; and
  generating frames of output data based on the determined new frame packing rules.

3. The method of claim 1, wherein the determining whether the frame uses PDU routing or signal routing based on the number of bits in the frame comprises:

assigning a frame to PDU routing if the input signals are group signals; and assigning a frame to PDU routing if the frame is larger than a predetermined size.

4. The method of claim 1, wherein the existing data dictionary information comprises information on a signal and a network the signal is being communicated on.

5. The method of claim 1, wherein the topology information comprises at least one from among information on electronic controller unit (ECU) to bus mapping, information on a protocol used by an ECU, and information on buses used by an ECU.

6. The method of claim 1, wherein the input signals are received via a controller area network (CAN) bus.

7. The method of claim 1, wherein the input signals are received via a gateway.

8. A non-transitory computer readable medium comprising computer executable instructions executable by a processor to perform the method of claim 1.

9. An apparatus for generating frames for a communication network, the apparatus comprising:
at least one memory comprising computer executable instructions; and
at least one processor configured to read and execute the computer executable instructions, the computer executable instructions causing the at least one processor to:
receive input signals and signal information, the signal information comprising at least one from among new signal information, existing data dictionary information, and topology information;
determine frame packing rules based on the received signal information; and generate frames of output data based on the determined frame packing rules,
wherein the computer executable instructions further cause the at least one processor to determine the packing rules based on the signal information by;
mapping the input signals to frames based on a best fit algorithm;
reducing a number of the frames;
assigning priorities to each of the frames based on a periodic rate and minimum update time of the input signals;
for each of the frames, determining whether a frame uses protocol data unit (PDU) routing or signal routing based on a number of bits in a frames; and
eliminating burst and priority inversion by assigning offsets to the frames.

10. The apparatus of claim 9, wherein the computer executable instructions further cause the at least one processor to:
estimate bus load and message latency of the generated frames;
determine whether the estimated bus load and message latency fall within predetermined bus load and message latency parameters;
in response to determining that the estimated bus load and message latency fall are outside of the predetermined bus load and message latency parameters, determine new frame packing rules based on the signal information and the estimated bus load and message latency; and
generate frames of output data based on the determined new frame packing rules.

11. The apparatus of claim 9, wherein the computer executable instructions cause the at least one processor to determine whether each of the frames use PDU routing or signal routing based on the number of bits in the frame by:
assigning a frame to PDU routing if the input signals are group signals; and
assigning a frame to PDU routing if the frame is larger than a predetermined size.

12. The apparatus of claim 9, wherein the existing data dictionary information comprises information on a signal and a network the signal is being communicated on.

13. The apparatus of claim 9, wherein the topology information comprises at least one from among information on electronic controller unit (ECU) to bus mapping, information on a protocol used by an ECU, and information on buses used by an ECU.

14. The apparatus of claim 9, wherein the computer executable instructions cause
the at least one processor to receive the input signals via a controller area network (CAN) bus.

15. The apparatus of claim 9, wherein the computer executable instructions cause
the at least one processor to receive the input signals via a gateway.

16. A non-transitory computer readable medium comprising instructions executable by a processor to perform a method for communicating over a vehicle network, the method comprising:
receiving, from a controller area network (CAN) of a vehicle, input signals and signal information, the signal information comprising at least one from among new signal information, existing data dictionary information, and topology information;
determining frame packing rules based on the received signal information; and
generating frames of output data based on the determined frame packing rules
wherein the determining the packing rules based on the signal information further comprises:
mapping the input signals to frames based on a best fit algorithm;
reducing a number of the frames;
assigning priorities to each of the frames based on a periodic rate and minimum update time of the input signals;
for each of the frames, determining whether a frame uses protocol data unit (PDU) routing or signal routing based on a number of bits in a frame; and
eliminating burst and priority inversion by assigning offsets to the frames.

* * * * *